Patented Dec. 22, 1953

2,663,720

UNITED STATES PATENT OFFICE 2,663,720

PREPARATION OF ORGANIC ESTERS

Eugene F. Hill, Detroit, Mich., assignor to Ethyl Corporation, New York, N. Y., a corporation of Delaware No Drawing. Application September 28, 1951, Serial No. 248,865

5 Claims. (Cl. 260—429)

This invention pertains to the preparation of certain organic esters, and more particularly to a new process for making esters of metals of group IV B of the periodic table.

Various esters of these metals have been prepared. Two methods are generally employed. One involves condensation of an alcohol and a metal tetrahalide, like TiCl₄ in the presence of metallic sodium as a condensing agent. The chemical behavior of the group IV B elements, especially titanium and zirconium, is such that, although they have a valence of 4, alcohol will generally replace only three of the halogen substituents. The fourth halogen is so closely bound to the metal that a strong condensing agent is required to effect its removal and allow addition of the fourth alcohol group.

The second method, particularly useful for the higher alcohols and consequently the more complex esters, is to react a relatively simple metal ester with the desired alcohol, forming the new product by transesterification. This method obviously requires the previous formation by other means of the metal ester starting reactant, so that the first procedure above described is the basic one. That procedure, however, has one grave disadvantage, in that metallic sodium is a highly expensive material.

It has now been discovered that tetraesters of these group IV B metals can readily be prepared by means of condensing agents which are much more effective than sodium and yet are materially less expensive. Broadly speaking, this invention comprises interreacting an alcohol, a halide of a group IV B metal, an alkali metal and an alkaline earth metal. For some reason not presently understood, use of a condensing agent comprising both an alkaline earth metal and an alkali metal, markedly increases the ease of reaction and the yield of the desired ester products.

Specifically, and according to certain preferred embodiments, the new process comprises interreacting an aliphatic alcohol, a tetrahalide of a periodic group IV B metal, an alkali metal and an alkaline earth metal. The product of such a reaction is a tetraalkyl- or alkylorthoester of the particular IV B metal. Thus, an alcohol such as ethanol, a propanol, a butanol, the amyl alcohols, dodecyl alcohol, stearyl alcohol or the like can be condensed with titanium tetrachloride or zirconium tetrachloride in the presence of a mixture of an alkali metal, e. g. sodium or potassium or mixtures thereof, and an alkaline earth metal, e. g. calcium or barium or mixtures thereof. With this novel condensing agent all four chlorine atoms are removed from the IV B metal and replaced by alkoxy groups. Such products as tetraethyltitanate, tetrabutyltitanates, tetrapropylzirconates, etc. are recovered. These are recognized as of great utility in commerce, particularly as water-proofing agents for fabrics and textiles.

It is possible to effect the reaction by simultaneously commingling the alcohol, halide and mixed metals condensing agent. It is also perfectly feasible to react the alcohol first with the condensing agent and then introduce the IV B metal halide. However, in commercial operation for best results and highest yields, it is very desirable to condense the halide with the alcohol, i. e. so that as many alcohol groups as possible will be added to the metal atom, and then to react the condensate with the mixture of alkali metal and alkaline earth metal. For instance, when an alcohol (ROH) is treated with titanium tetrachloride, presumably an intermediate like $$Ti(OR)_3Cl \cdot 3HCl$$

is formed. The condensing agent then serves both to remove the last chlorine atom and to combine with the three molecules of HCl. The alkali metal-alkaline earth metal agent is for some reason much more potent than alkali metal alone in effecting this removal and combination.

One method of operating this invention is especially successful and preferred, because it utilizes a relatively cheap by-product, which would otherwise be of little or no value and extremely difficult to dispose of. This preferred procedure is to condense the alcohol and the tetrahalide with sludge residue from anhydrous alkali metal halide electrolysis.

Alkali metals are generally prepared by electrolyzing a fused alkali metal halide at a comparatively high temperature. An alkaline earth halide is usually added to the melt to lower its melting point. The desired alkali metal is separated from the mass after electrolyzing, but a heel or residue of so-called "sludge" remains. This consists of the added alkaline earth metal and alkali metal which has not easily separated, together with possible other contaminants. This sludge is extremely reactive and consequently dangerous to handle, so that its disposal is a serious problem. Since it contains an appreciable quantity of valuable metals, recovery or use thereof in some other process is even more important than mere disposal, so that the costs of alkali metal production may be correspondingly reduced. Sometimes the sludge is filtered, whereby additional alkali metal is obtained; but the filtercake still is composed of commercially valuable metals.

Using the manufacture of sodium as an example, fused sodium chloride is electrolyzed at about 560° C. in the presence of calcium chloride, which is added to lower the melting point. Some of the additive is itself electrolyzed, so that the product is contaminated with dissolved calcium. The sodium-calcium mixture is cooled to about 150° C. to precipitate the latter metal. The supernatant liquid sodium is then decanted, leaving a sludge residue composed of about 70% sodium, 20% calcium and 10% metal oxides and chlorides. If the sludge is then filtered again, the filtercake still contains about 40% sodium, 40% calcium and 20% of other contaminants. Sometimes potassium chloride is introduced to the electrolysis as well as calcium chloride, hence potassium may be one of the contaminants. Depending upon the particular conditions of electrolysis and the extent to which the residue is further treated to recover sodium values, the final sludge (either the cell residue as such or the refiltered filtercake) may contain anywhere from 25% to 95% by weight of sodium and from 5% to 75% by weight of calcium.

As previously indicated, it is such sludge residues which are particularly successful as condensing agents in the present process. A valuable use for these hitherto undesirable and hazardous materials has been discovered. Furthermore, the process in which they are used is an incomparable improvement over that previously known.

The different operating conditions for the present invention will obviously vary interdependently with one another. Thus, the reaction temperature should be correlated with the particular halide and the particular alcohol employed. The temperature is generally maintained at somewhat below the boiling point of the halide until condensation is sufficiently complete to avoid loss of this reactant. Thereafter, the reaction can proceed simply at room temperature, or preferably at a temperature about as high as the normal reflux temperature of the alcohol. Preferred alcohols are those of the monohydroxy aliphatic series containing between one and eighteen carbon atoms. It is often better, also, to maintain an excess of alcohol during the operation, or in the case of a tetrahalide more than four moles of alcohol per mole of halide. The reaction is generally conducted in a suitable solvent. This solvent can very well be the excess alcohol itself, although substantially any other inert solvent, such as toluene, benzene or the like, can be employed.

Essentially any group IV B metal halide will respond satisfactorily to this process. For most commercial purposes today titanium and zirconium esters are especially desired, and the chlorides of these metals are most readily available. Consequently, titanium tetrachloride and zirconium tetrachloride, or sometimes the corresponding tetrabromides, are preferred reactants. As previously inferred, electrolysis sludge residues and especially sodium-calcium residues, are generally chosen as the condensing agents. Such residues can be used in bulk, i. e. in large pieces as they are obtained from the cell or second filtercake. Preferably, however, for greatest reactivity they are utilized in dispersed form. To prepare such dispersions, the residue is remelted to a temperature of about the melting point of the alkali metal component in the presence of an inert diluent, preferably a hydrocarbon, a surface-active agent is then added, and the mass is allowed to solidify in that dispersed condition. As is obvious from the above discussion of the type of reaction which apparently occurs, it is best to use about four equivalents of condensing agent for the amount of halogen bound to the group IV B metal. Similarly, for complete reaction about four moles of alcohol should be used for each mole of group IV B metal tetrahalide.

The following examples are given by way of illustration and are not to be considered as the only embodiments of this invention. It is to be understood that protection hereof is only to be limited by the specific wording of the appended claims.

Example I

A solution of 300 parts of dried secondary butyl alcohol was prepared in 250 parts of dried benzene and cooled to 8° C. 96.4 parts of titanium tetrachloride was added to the mixture during a period of one-half hour, while the temperature was maintained at between 5° and 10° C. The reaction mass was then stirred at a temperature of 10° C. for one hour and at a temperature of 25° C. for an additional five-hour period, and then warmed to reflux. Filter sludge was recovered from a sodium cell, analyzed and found to contain about 90% active sodium and calcium metals, 70% being sodium and 20% calcium. This sludge was added in small pieces to the chloride-alcohol reaction mixture, until 56.3 parts had been introduced. The benzene solvent was removed by distillation at a pot temperature of about 160° C. and the residue was distilled at reduced pressure. A colorless, somewhat viscous oil resulted, boiling point at 1 mm., 120–125° C. and $n_D^{35}$, 1.4515–1.4545. The product comprised the tetra-sec-butyl ester of titanium in a yield of 81.6%, based on the initial TiCl$_4$. Based on the sodium content of the sludge, the yield was 96.8%.

The above process was repeated, but pure soduim was substituted for the filtercake. A yield of only 28.4%, based on the TiCl$_4$, was obtained.

Example II

Tetraethyltitanate was prepared by mixing 94.2 parts of TiCl$_4$ with 804 parts of dried ethanol. Sodium-calcium filtercake, containing 50% calcium, 40% sodium and 10% of contaminants including potassium was melted, treated with a dispersing agent and allowed to solidify. This material was then added in small bits to the chloride-alcohol reaction mixture, 57 parts by weight in all being used. The mass was stirred at 18° C. for 1½ hours, at room temperature for an additional hour and under refluxing conditions for three hours. The excess alcohol solvent was removed by distillation and the residue further distilled at reduced pressure. A high yield of the tetraethyl ester of titanium resulted. It was a dark yellow viscous oil: B. P. at 1–4 mm., 122–145° C.; $n_D^{35}$, 1.4845–1.5018.

Tetraethyl zirconate was readily prepared by this same procedure, using ZrCl$_4$.

Example III

Tetraisopropyltitanate was prepared by reacting one-half mole of titanium tetrachloride with four moles of isopropyl alcohol in the presence of four equivalents of a condensing agent consisting of 75% sodium and 25% calcium.

The same ester resulted when titanium tetrabromide was substituted for the TiCl₄ and the condensing agent comprised 75% by weight of potassium and 25% by weight of barium.

I claim:

1. A process which comprises interreacting an alcohol, a halide of a periodic group IV B metal and a mixture containing an alkali metal and at least 5% by weight of an alkaline earth metal.

2. A process which comprises condensing an aliphatic alcohol with a tetrahalide of a periodic group IV B metal and reacting the condensate with a mixture of an alkali metal and an alkaline earth metal, said mixture containing at least 5% by weight of said alkaline earth metal.

3. A process according to claim 2 wherein the tetrahalide is titanium tetrachloride.

4. A process according to claim 2 wherein the mixture of alkali and alkaline earth metals comprises substantially from 25% to 95% by weight of sodium with substantially from 75% to 5% by weight of calcium.

5. A process according to claim 2 wherein the mixture of alkali and alkaline earth metals comprises sludge residue from anhydrous alkali metal halide electrolysis.

EUGENE F. HILL.

References Cited in the file of this patent

Speer, J. Org. Chem., vol. 14, pages 655–59 (1949).